United States Patent
Furihata

(10) Patent No.: US 10,218,920 B2
(45) Date of Patent: Feb. 26, 2019

(54) IMAGE PROCESSING APPARATUS AND CONTROL METHOD FOR GENERATING AN IMAGE BY VIEWPOINT INFORMATION

(71) Applicant: CANON KABUSHIKI KAISHA, Tokyo (JP)

(72) Inventor: Hisayoshi Furihata, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 23 days.

(21) Appl. No.: 15/414,340

(22) Filed: Jan. 24, 2017

(65) Prior Publication Data

US 2017/0223281 A1  Aug. 3, 2017

(30) Foreign Application Priority Data

Jan. 29, 2016 (JP) .................................. 2016-016372

(51) Int. Cl.
| | |
|---|---|
| *H04N 5/228* | (2006.01) |
| *H04N 5/265* | (2006.01) |
| *G06T 7/70* | (2017.01) |
| *G06T 15/20* | (2011.01) |

(52) U.S. Cl.
CPC .............. *H04N 5/265* (2013.01); *G06T 7/70* (2017.01); *G06T 15/205* (2013.01); *G06T 2207/10016* (2013.01); *G06T 2207/30244* (2013.01)

(58) Field of Classification Search
CPC .......... A63F 13/10; A63F 13/12; A63F 13/53; A63F 13/213; A63F 13/327; A63F 13/34; A63F 13/211; G06K 9/3275; G06K 9/00671; H04N 5/217; H04N 5/357; G06F 3/017; G06T 19/006; G06T 7/74; G06T 19/20

See application file for complete search history.

(56) References Cited

U.S. PATENT DOCUMENTS

| | | | |
|---|---|---|---|
| 2008/0100620 A1* | 5/2008 | Nagai | A63F 3/00643 345/424 |
| 2012/0257788 A1* | 10/2012 | Ogasawara | A63F 13/655 382/103 |
| 2013/0157762 A1* | 6/2013 | Yamaguchi | A63F 13/06 463/31 |
| 2015/0130790 A1* | 5/2015 | Vasquez, II | G06T 19/006 345/419 |
| 2017/0011496 A1* | 1/2017 | Lu | G06T 15/50 |
| 2018/0047214 A1* | 2/2018 | Kamhi | G06T 19/006 |

FOREIGN PATENT DOCUMENTS

JP        2013-61870 A      4/2013

* cited by examiner

*Primary Examiner* — Kelly L Jerabek
(74) *Attorney, Agent, or Firm* — Canon U.S.A., Inc. IP Division

(57) ABSTRACT

An image processing apparatus includes: an acquisition unit configured to acquire viewpoint information indicating a viewpoint; a generation unit configured to generate a determined-viewpoint image based on a plurality of captured images captured from a plurality of directions and the viewpoint information acquired by the acquisition unit, wherein the generation unit performs an inclination correction process for correcting an inclination, according to the viewpoint information, of the determined-viewpoint image; and an output unit configured to output the determined-viewpoint image generated by the generation unit.

14 Claims, 5 Drawing Sheets

IMAGE PROCESSING APPARATUS AND CONTROL METHOD FOR GENERATING AN IMAGE BY VIEWPOINT INFORMATION

BACKGROUND OF THE INVENTION

Field of the Invention

The present invention relates to a technique to generate an image in accordance with the information indicating a viewpoint.

Description of the Related Art

Techniques to generate an image in accordance with the information indicating a viewpoint have been known. For example, there is a free-viewpoint image generation technique in which synthesizing a plurality of images captured from a plurality of directions generates an image captured by a camera virtually located in the space (hereinafter, referred to as a virtual camera). The user can arbitrarily designate the position and orientation of the virtual camera, and the designated position and orientation of the virtual camera are the information indicating the viewpoint of the free-viewpoint image. In other words, the image captured by the virtual camera depicts the view from the arbitrary viewpoint.

As a method for acquiring the information indicating a viewpoint, there is a method for calculating the position and orientation of the apparatus physically operated by the user. The calculated position and orientation of the apparatus can be used as the information indicating the viewpoint, for example, the position and orientation of the virtual camera described above. Japanese Patent Laid-Open No. 2013-61870 discloses a technique in which a mobile terminal operated by the user captures an area including a two-dimensional marker and calculates the relative position and relative orientation of the mobile terminal to the marker based on the captured image.

However, when the image in accordance with the information indicating a viewpoint is output, the visibility of the output image is sometimes decreased. For example, it is assumed that a viewpoint is determined based on the position and orientation of the mobile terminal calculated by the technique described in Japanese Patent Laid-Open No. 2013-61870, and an image depicting the view from the determined viewpoint is generated and output. In this assumption, even when the user intends to control the position and orientation of the mobile terminal to designate a desired viewpoint by physically operating the mobile terminal, it is difficult to accurately operate the mobile terminal as intended, for example, due to a camera shake. This may generate an unintended inclination in the output image.

SUMMARY OF THE INVENTION

An image processing apparatus includes: an acquisition unit configured to acquire viewpoint information indicating a viewpoint; a generation unit configured to generate a determined-viewpoint image based on a plurality of captured images captured from a plurality of directions and the viewpoint information acquired by the acquisition unit, wherein the generation unit performs an inclination correction process for correcting an inclination, according to the viewpoint information, of the determined-viewpoint image; and an output unit configured to output the determined-viewpoint image generated by the generation unit.

Further features of the present invention will become apparent from the following description of exemplary embodiments (with reference to the attached drawings).

DESCRIPTION OF THE EMBODIMENTS

Hereinafter, with reference to the appended drawings, the present invention will be described in detail based on the embodiments. Note that the present invention according to the scope of claims is not limited to the embodiments. Furthermore, all the combinations of features to be described below in the embodiments are not necessarily essential for the present invention.

[Configuration of System]

Figure 1:
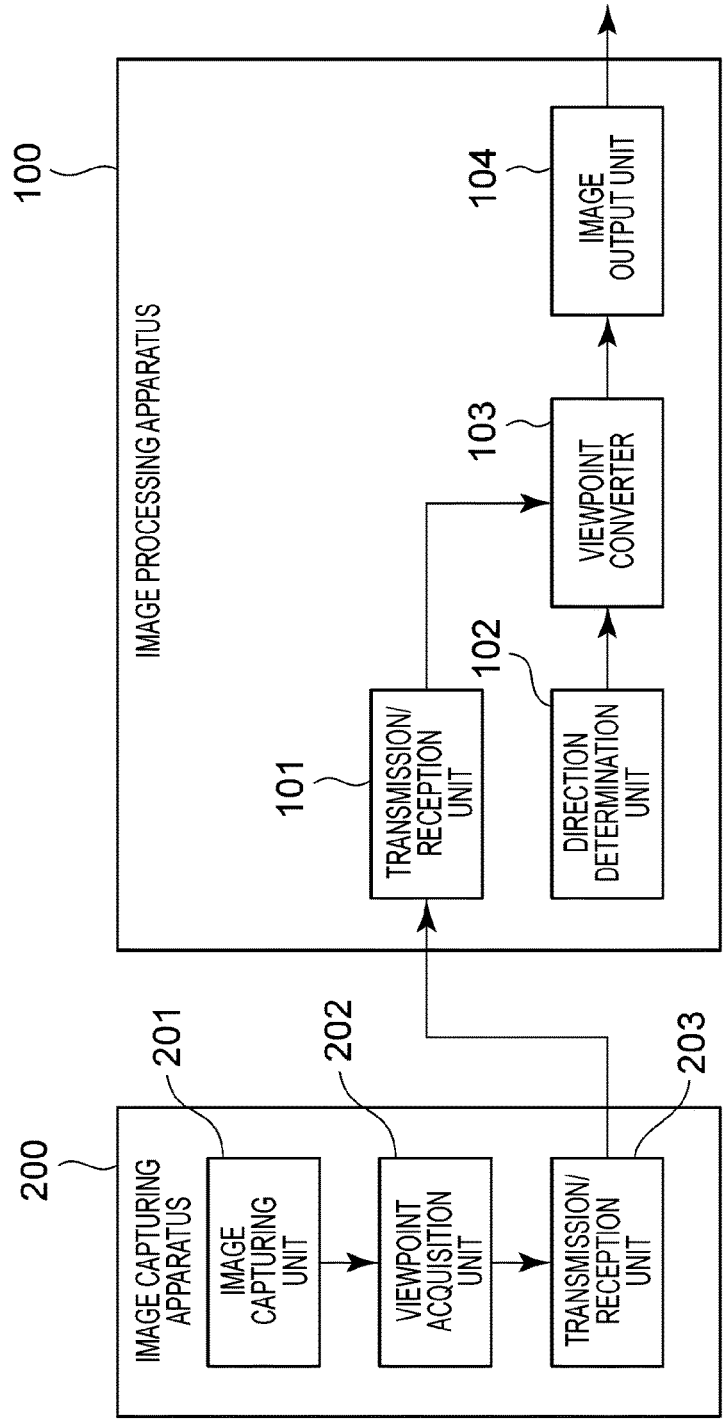
FIG. 1 is a block diagram of the configuration of an image processing system according to an embodiment.

FIG. 1 is a block diagram of the configuration of an image processing system according to the present embodiment. As illustrated in FIG. 1, the image processing system includes an image processing apparatus 100 and an image capturing apparatus 200 that mutually communicate with each other. Note that, in the present embodiment, an example in which the image processing apparatus 100 and the image capturing apparatus 200 are separate devices will mainly be described. However, the image processing apparatus 100 may be integrated with the image capturing apparatus 200.

The image capturing apparatus 200 acquires viewpoint information based on a captured image, and transmits the viewpoint information to the image processing apparatus 100. The viewpoint information in the present embodiment indicates the viewpoint of the image generated by the image processing apparatus 100 and, for example, indicates the position of the viewpoint, direction of the line of sight, and rotation angle around the line of sight in the free-viewpoint image. The image processing apparatus 100 outputs an image in accordance with the viewpoint information received from the image capturing apparatus 200. Note that the image capturing apparatus 200 in the present embodiment sequentially transmits the acquired viewpoint information items to the image processing apparatus 100. Not only this, however, the image capturing apparatus 200 may store the acquired viewpoint information items over a predetermined period of time, and collectively transmit the stored viewpoint information items to the image processing apparatus 100. The image output by the image processing apparatus 100 may be either a moving image or a still image. Alternatively, the viewpoint information transmitted by the image capturing apparatus 200 does not include at least one of the information item of the position of the viewpoint and the information item of the direction of the line of sight, and the image processing apparatus 100 may have a mode in which a predetermined value is used as the information items that are not included. A concrete example of the image processing apparatus 100 is a personal computer or a smart device, and a concrete example of the image capturing apparatus 200 is a smart device or a digital camera.

The image processing apparatus 100 includes a transmission/reception unit 101, a direction determination unit 102, a viewpoint converter 103, and an image output unit 104. The transmission/reception unit 101 receives the viewpoint information transmitted from the image capturing apparatus 200. The direction determination unit 102 determines the reference direction for a coordinate system that is the reference for the viewpoint information. The viewpoint converter 103 converts the viewpoint information received by the transmission/reception unit 101 based on the reference direction determined by the direction determination unit 102. Then, the image output unit 104 generates and outputs an image in accordance with the viewpoint information converted by the viewpoint converter 103. Although the destination to which the image is to be output is not limited, the image output unit 104 outputs the image, for example, to a display device such as a liquid crystal display or a projector.

Figure 5:
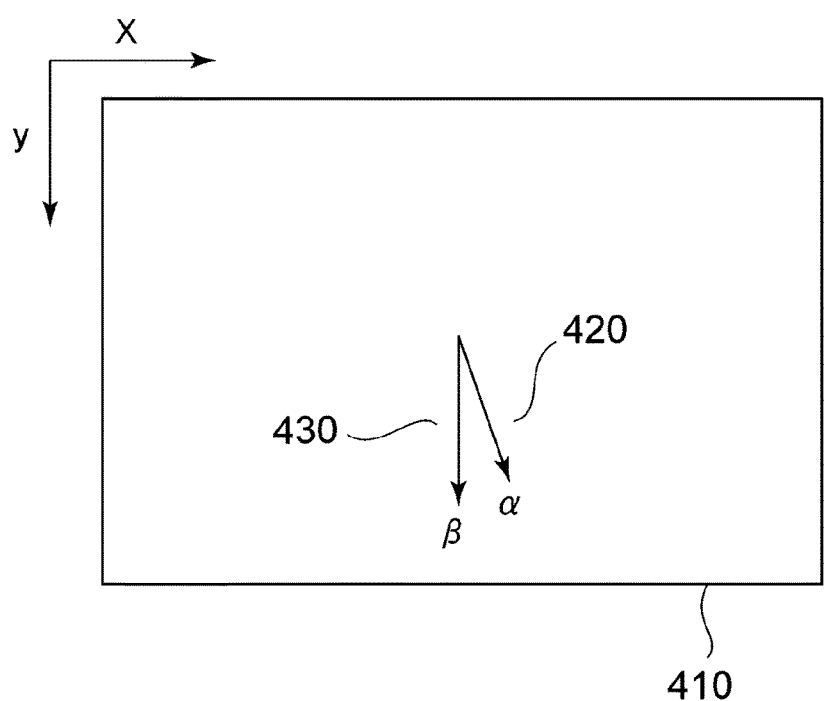
FIG. 5 is an explanatory diagram of a method for converting the viewpoint information.

The reference direction determined by the direction determination unit 102 is a direction that the image output unit 104 uses as the reference for generating an image. For example, the image output unit 104 uses a free-viewpoint image generation technique to place an object in a virtual space based on the coordinate system that is the reference for the viewpoint information such that the reference direction is identical to the vertically downward direction determined for the object (the direction of gravitational force). Then, the image output unit 104 generates an image depicting a view of the object viewed from the viewpoint determined in accordance with the viewpoint information. The viewpoint converter 103 converts the viewpoint information, and this conversion enables the image output unit 104 to generate an image in which the inclination is corrected, for example, an image in which the downward direction of the image (the y direction in the image 410 in the example of FIG. 5) is identical to the direction of gravitational force of the image.

Note that, in the present embodiment, an example in which the image output unit 104 generates an image using a 3D model based on a plurality of images captured from a plurality of directions as an object will mainly be described. Not only this, however, the object may be a model generated with Computer Graphics (CG) instead of the captured images.

The image capturing apparatus 200 includes an image capturing unit 201, a viewpoint acquisition unit 202, and a transmission/reception unit 203. The image capturing unit 201 captures an image. The viewpoint acquisition unit 202 acquires the viewpoint information based on the image captured by the image capturing unit 201. The transmission/reception unit 203 transmits the viewpoint information acquired by the viewpoint acquisition unit 202 to the image processing apparatus 100.

Figure 2:
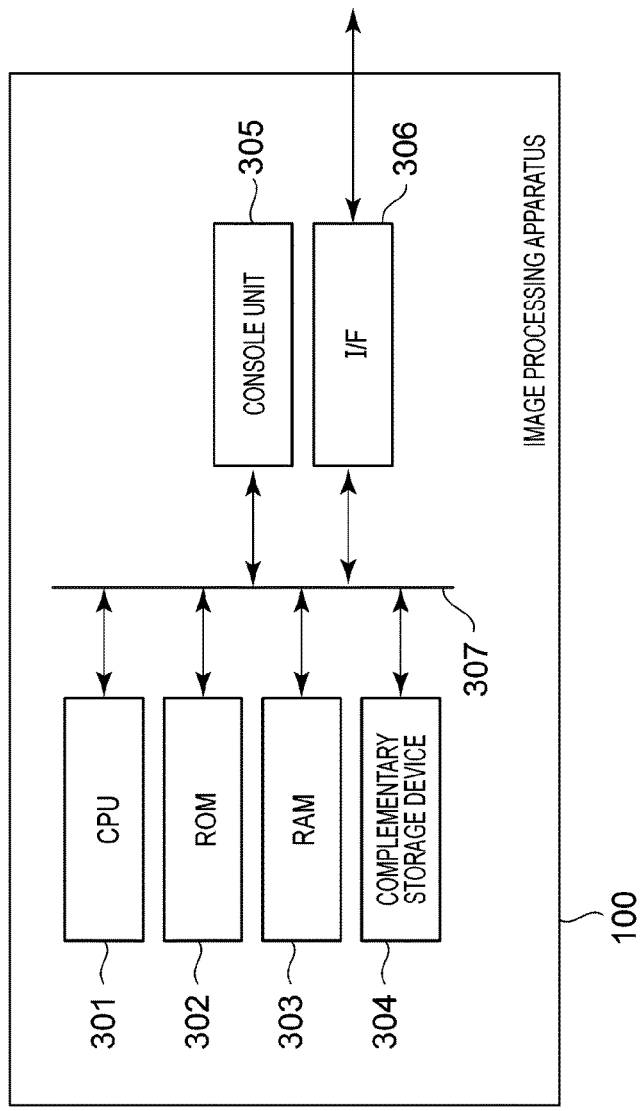
FIG. 2 is a block diagram of the hardware configuration of an image processing apparatus 100 according to an embodiment.

Next, with reference to FIG. 2, the hardware configuration of the image processing apparatus 100 will be described. The image processing apparatus 100 includes a CPU 301, a ROM 302, a RAM 303, a complementary storage device 304, a console unit 305, an interface (I/F) 306, and a bus 307.

The CPU 301 controls the whole image processing apparatus 100 using the computer program or data stored in the ROM 302 or the RAM 303. In other words, the CPU 301 functions as each component in the image processing apparatus 100 illustrated in FIG. 1. The ROM 302 stores a program or parameter that does not need changing. The RAM 303 temporarily stores, for example, the program or data supplied from the complementary storage device 304 and the data acquired via the I/F 306 from the outside. The complementary storage device 304 includes, for example, a hard disk drive device so as to store content data such as a still image or a moving image.

The console unit 305 includes, for example, a keyboard or a mouse so as to receive the user operation and input each instruction to the CPU 301. A network such as a LAN or the Internet, or another device such as a projection device or a display device can be connected to the I/F 306 such that the image processing apparatus 100 can acquire or transmit various types of information via the I/F 306. The bus 307 transmits the information by connecting the units described above.

Note that, in the present embodiment, the console unit 305 is in the image processing apparatus 100. However, the console unit 305 may exist as a different device outside the image processing apparatus 100. In such a case, the CPU 301 works as an operation control unit that controls the console unit 305. Note that the image processing apparatus 100 may perform a process with hardware in place of a software process with the CPU 301. In such a case, the image processing apparatus 100 includes an arithmetic unit or circuit corresponding to each component of FIG. 1.

[Flow of Process in Image Processing Apparatus 100]

Figure 3:
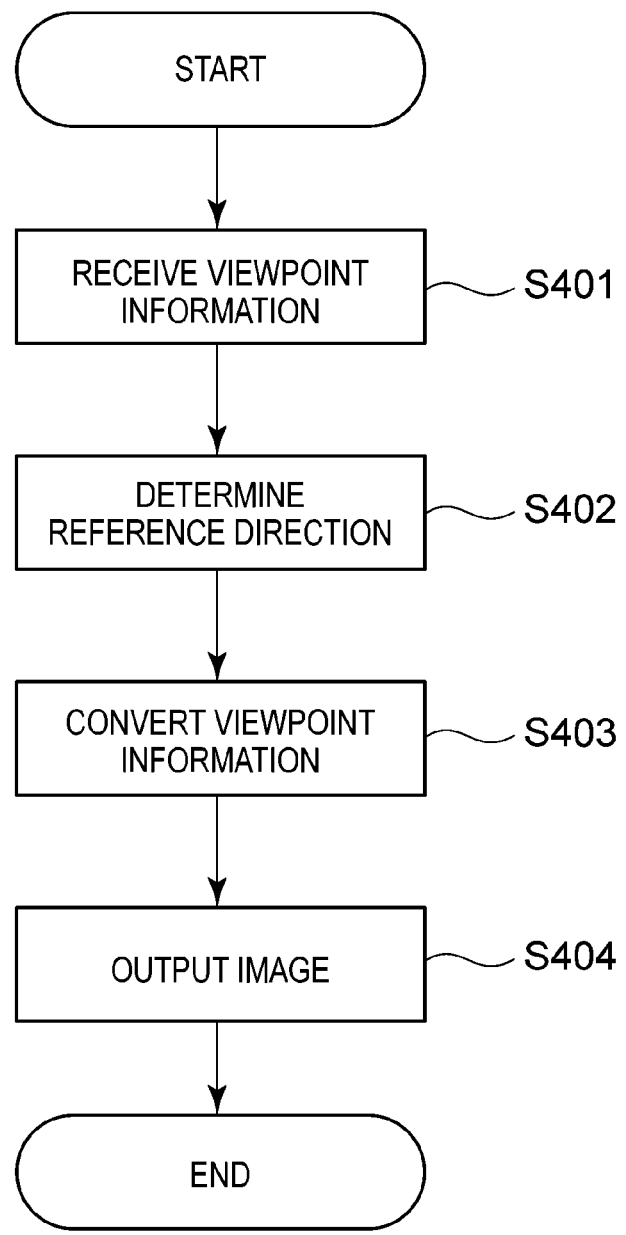
FIG. 3 is an explanatory flowchart of the operation of the image processing apparatus 100.

Next, the flow of the process in the image processing apparatus 100 will be described. FIG. 3 is an explanatory flowchart of the operation of the image processing apparatus 100. The process of FIG. 3 starts at the time the connection for communication between the image processing apparatus 100 and the image capturing apparatus 200 is established. However, the time to start the process of FIG. 3 is not limited to the time described above. The CPU 301 develops and executes the program stored in the ROM 302 in the RAM 303. This execution implements the process of FIG. 3.

In S401, the transmission/reception unit 101 of the image processing apparatus 100 receives and acquires the viewpoint information transmitted from the image capturing apparatus 200. Hereinafter, an exemplary method in which the image capturing apparatus 200 acquires the viewpoint information to be transmitted to the image processing apparatus 100 will be described with reference to FIG. 4. The user operates the image capturing apparatus 200 to designate a viewpoint, and the image capturing unit 201 captures an installed two-dimensional marker 220. Based on the captured image, the viewpoint acquisition unit 202 calculates the position and orientation of the image capturing apparatus 200 in a coordinate system 230 based on the two-dimensional marker 220. Then, the transmission/reception unit 203 transmits the position information and orientation information about the image capturing apparatus 200 based on the calculation result by the viewpoint acquisition unit 202 as the viewpoint information to the image processing apparatus 100. The transmission/reception unit 101 of the image processing apparatus 100 acquires the position information and orientation information transmitted by the transmission/reception unit 203 of the image capturing apparatus 200. The position information about the image capturing apparatus 200 indicates the position of viewpoint. The orientation information about the image capturing apparatus 200 indicates the direction of the line of sight and the rotation angle around the line of sight as an axis. The rotation angle around the line of sight as an axis indicates the extent to which the view is rotated (inclined). To calculate the position and orientation of the image capturing apparatus 200 using the two-dimensional marker 220, a publicly known technique can be used.

Figure 4:
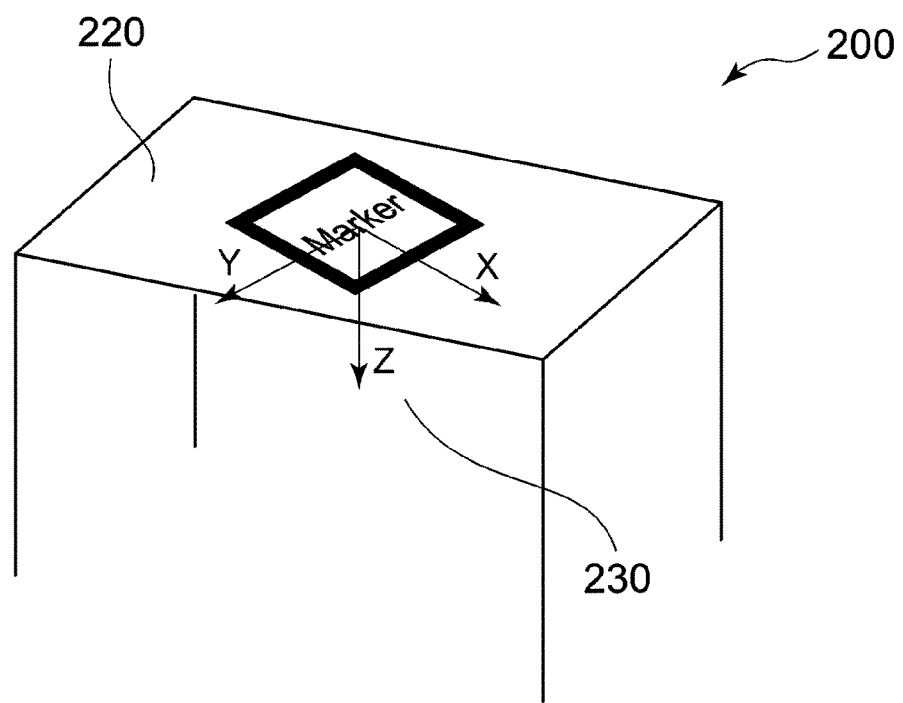
FIG. 4 is an explanatory diagram of a method for acquiring the viewpoint information.

In S402, the direction determination unit 102 determines the reference direction of the coordinate system that is the reference for the viewpoint information. In the example of FIG. 4, the coordinate system 230 is the reference for the viewpoint information. The direction determination unit 102 of this example determines, for example, the Z-axis direction of the coordinate system 230, in other words, the direction perpendicular to the two-dimensional marker 220 as the reference direction. In the present embodiment, the direction in which the reference direction determined by the direction determination unit 102 is oriented with respective to the plane of the two-dimensional marker 220 is previously set in the image processing apparatus 100. Note that the direction determination unit 102 may determine the reference direction, for example, in accordance with the information transmitted from the image capturing apparatus 200 to the image processing apparatus 100.

Note that, in the present embodiment, an example in which the image capturing apparatus 200 transmits the viewpoint information to the image processing apparatus 100 will mainly be described. However, the transmission is not limited to the example. For example, the transmission/reception unit 203 of the image capturing apparatus 200 may transmit a captured image of the marker captured by the image capturing unit 201 to the image processing apparatus 100. In such a case, the direction determination unit 102 calculates the viewpoint information based on the captured image received by the transmission/reception unit 101 and further determines the reference direction.

In S403, based on the reference direction determined by the direction determination unit 102, the viewpoint converter 103 converts the viewpoint information acquired by the transmission/reception unit 101. A method for converting the viewpoint information will be described below.

In S404, the image output unit 104 generates and outputs an image in accordance with the viewpoint information converted by the viewpoint converter 103. Hereinafter, an example in which the image processing apparatus 100 outputs an image captured by a virtual camera located in a virtual space using a free-viewpoint image generation technique will specifically be described. The position and orientation of the virtual camera is fixed in accordance with the viewpoint information, and the direction of an object to be captured in the virtual space is fixed based on the reference direction. In other words, the image captured by the virtual camera is a determined-viewpoint image depicting the view of the object located based on the reference direction in the virtual space and viewed from the viewpoint determined in accordance with the viewpoint information. First, the image output unit 104 acquires a plurality of images captured from a plurality of directions from an external device different from the image capturing apparatus 200. Then, the image output unit 104 generates a determined-viewpoint image using the captured images acquired from the external device and the viewpoint information acquired by the transmission/reception unit 101 and converted by the viewpoint converter 103. The converting process by the viewpoint converter 103 is a process for correcting the information about the inclination of the determined-viewpoint image included in the viewpoint information acquired by the transmission/reception unit 101. The converting process performed by the viewpoint converter 103 enables the image output unit 104 to generate a determined-viewpoint image in which the inclination included in the viewpoint information is corrected. At last, the image output unit 104 outputs the generated determined-viewpoint image.

Note that the image output unit 104 may acquire the data of a 3D model generated from a plurality of captured images instead of acquiring a plurality of images captured from a plurality of directions, and generate a determined-viewpoint image using the model and the viewpoint information. Alternatively, the image output unit 104 may generates a determined-viewpoint image using a model generated with CG instead of the captured images, and the viewpoint information.

The flow of the process in the image processing apparatus 100 has been described above. Next, the conversion of the viewpoint information by the viewpoint converter 103 will be described with reference to FIG. 5. An image 410 is an example of an image captured by a virtual camera (a determined-viewpoint image) generated by the image processing apparatus 100.

The viewpoint converter 103 converts the viewpoint information acquired by the transmission/reception unit 101 such that a reference direction 420 determined by the direction determination unit 102 is close to a target direction 430 in the image 410. The target direction 430 is a predetermined direction of the determined-viewpoint image and the downward direction (y direction) in the example of FIG. 5. In the present embodiment, the target direction 430 is previously set in the image processing apparatus 100. The target direction is not limited to the present embodiment, and may be a direction, for example, designated by the user. The determined-viewpoint image in accordance with the converted viewpoint information is the image output by the image output unit 104. Note that, in the present embodiment, the fact that the reference direction 420 is close to the target direction 430 means that the angle between the vector of the reference direction 420 and the vector of the target direction 430 is reduced. This also includes that the reference direction 420 is identical to the target direction 430.

As a concrete example to which the present embodiment is applied, it is assumed that the viewpoint information based on the coordinate system 230 is acquired from the captured image of the two-dimensional marker 220 captured by the image capturing apparatus 200, and the reference direction 420 is the Z-axis direction in the coordinate system 230. The image processing apparatus 100 uses a free-viewpoint image generation technique to generate the image 410 by synthesizing a plurality of images captured from a plurality of directions such that the reference direction 420 is the direction of gravitational force in the determined-viewpoint image.

When it is considered that the user sees the image 410 output to a display device horizontally placed on this assumption, it is preferable in terms of the visibility for the user that the downward direction of the display device is identical to the direction of gravitational force in the image 410. In light of the foregoing, the target direction 430 is the downward direction of the determined-viewpoint image in the present embodiment. Then, as a process for correcting the inclination included in the viewpoint information, the viewpoint converter 103 converts the viewpoint information such that the reference direction 420 that is the direction of gravitational force in the determined-viewpoint image is close to the target direction 430. The inclination included in the viewpoint information is the inclination of the determined-viewpoint image caused by the difference between the reference direction 420 and the target direction 430, and is determined, for example, based on the inclination of the two-dimensional marker 220 in the image captured by the image capturing apparatus 200.

Next, an exemplary method in which the viewpoint converter 103 converts the viewpoint information in order to make the reference direction 420 identical to the target direction 430 in the image 410 will specifically be described. The viewpoint information acquired by the transmission/reception unit 101 in S401 is expressed as a matrix P. The matrix P is a matrix of three rows and four columns, and includes a rotation matrix R of three rows and three columns and a translation vector T of three rows and a column. The reference direction 420 determined by the direction determination unit 102 in S402 is expressed with a three-dimensional unit vector A.

First, an angle α of the reference direction 420 in the image 410 that is the determined-viewpoint image in accordance with the viewpoint information before the conversion is calculated. A direction in the image 410 is expressed as an angle in a range of $-\pi$ to $\pi$ [rad] when the right direction of the image 410 is zero [rad] and the clockwise rotation is positive. When the component in the horizontal direction of a two-dimensional vector corresponding to the angle α in the image 410 is Ax and the vertical component is Ay, the angle α is calculated with expressions (1) and (2).

$$s \begin{pmatrix} Ax \\ Ay \\ 1 \end{pmatrix} = R \cdot A \qquad \text{expression (1)}$$

$$\alpha = \tan^{-1}(Ay/Ax) \qquad \text{expression (2)}$$

In the expression (1), the unit vector A expressing the reference direction 420 in the coordinate system that is the reference for the viewpoint information is multiplied by the rotation matrix R and thus converted into a vector in the coordinate system based on the viewpoint determined in accordance with the viewpoint information (the virtual camera). The coordinate system that is the reference for the viewpoint information is, for example, the coordinate system 230 based on the two-dimensional marker 220. In the expression (1), the s is a scale factor. In the expression (2), the angle α is calculated from the Ax and Ay found by the expression (1).

Next, a transformation matrix for the conversion of the viewpoint information in order to eliminate the difference between the reference direction 420 and the target direction 430 is calculated. The angle of the target direction 430 in the image 410 is an angle β. Furthermore, the difference between the angle β of the target direction 430 and the angle α of the reference direction 420 is expressed as an angle γ=(β−α). The conversion of the viewpoint information in order to correct the difference of the angle γ is expressed as an expression (3) with a rotation matrix R' of three rows and three columns that expresses the rotation around the direction of the line of sight determined from the viewpoint information (the z-axis direction in the coordinate system based on the determined viewpoint) as an axis.

$$R' = \begin{pmatrix} \cos(-\gamma) & -\sin(-\gamma) & 0 \\ \sin(-\gamma) & \cos(-\gamma) & 0 \\ 0 & 0 & 0 \end{pmatrix} \qquad \text{expression (3)}$$

At last, a matrix P expressing the viewpoint information acquired by the transmission/reception unit 101 is converted by the rotation matrix R' as expressed in an expression (4) such that a matrix P' expressing the converted viewpoint information is calculated.

$$P'=R'\cdot P \qquad \text{expression (4)}$$

As described above, the viewpoint converter 103 performs conversion of the viewpoint information, acquired by the transmission/reception unit 101, in terms of the rotation angle around the line of sight as an axis. The conversion is expressed as the rotation matrix R'. This conversion corrects the inclination of the image 410 included in the viewpoint information. As a result, the reference direction 420 is identical to the target direction 430 in the determined-viewpoint image in accordance with the converted viewpoint information expressed as the matrix P'.

As described above, the image processing apparatus 100 in the present embodiment acquires the viewpoint information indicating a viewpoint so as to generate and output a determined-viewpoint image in accordance with the acquired viewpoint information. In this generation of the determined-viewpoint image, the image processing apparatus 100 performs a process for correcting the inclination included in the viewpoint information. This correction enables the image processing apparatus 100 to improve the visibility of an image output in accordance with the information indicating a viewpoint when the image processing apparatus 100 outputs the image.

[Adjustment of the Extent of Inclination Correction]

The example in which the image processing apparatus 100 makes the reference direction identical to the target direction in the output image has been described above. However, the image processing apparatus 100 only needs to control the reference direction such that the reference direction is close to the target direction in the output image. For example, the viewpoint converter 103 determines the direction of the line of sight from the viewpoint information acquired by the transmission/reception unit 101. Then, the viewpoint converter 103 may perform a process for correcting the inclination to the extent in consideration of the relationship between the direction of the line of sight and the reference direction determined by the direction determination unit 102, and then generate a determined-viewpoint image. Such a control sometimes makes the output image easier to see for the user than the case in which the reference direction is constantly identical to the target direction in the output image.

Hereinafter, it will be considered that the image processing apparatus 100 uses a free-viewpoint image generation technique to generate a determined-viewpoint image such that the reference direction determined by the direction determination unit 102 is identical to the direction of gravitational force in the determined-viewpoint image. Furthermore, it will be assumed that the target direction is the downward direction of the determined-viewpoint image.

When the reference direction is nearly perpendicular to the direction of the line of sight and the inclination of the determined-viewpoint image to be output varies, the image looks to the user as if the direction in which the gravitational force acts varies in the image, and thus the user strongly feels uncomfortable with the image. In light of the foregoing, the image processing apparatus 100 can make an image to be output easy to see for the user by controlling the reference direction such that the reference direction is as close as possible to the target direction in the determined-viewpoint image.

On the other hand, when the reference direction is nearly parallel to the direction of the line of sight, the determined-viewpoint image is an image of an object captured by the virtual camera from the angle near to immediately above or immediately below the object. Thus, even if the inclination of the determined-viewpoint image to be output varies, the user feels less uncomfortable with the image. If a control to make the reference direction identical to the target direction is performed in this case, only a slight variation in position or orientation of the virtual camera sometimes drastically changes the image. This makes the output image difficult to see for the user.

In light of the foregoing, the image processing apparatus 100 may correct the inclination included in the viewpoint information to a smaller extent if the reference direction is nearly parallel to the direction of the line of sight. Hereinafter, a method for converting the viewpoint information in this case will specifically be described.

The viewpoint converter 103 determines the direction of the line of sight and the rotation angle around the line of sight as an axis from the viewpoint information acquired by the transmission/reception unit 101. The angle between the three-dimensional unit vector of the reference direction and the three-dimensional unit vector of the direction of the line of sight is θ. The rotation angle determined by the viewpoint converter 103 indicates the inclination of the view, and thus the angle γ indicating the difference between the reference direction and the target direction is determined based on the rotation angle determined by the viewpoint converter 103.

First, a coefficient k indicating the degree of perpendicularity in the relationship between the reference direction and the direction of line-of-sight is calculated as an expression (5). The coefficient k becomes zero when the reference direction is parallel to the direction of the line of sight, and becomes one when the reference direction is perpendicular to the direction of the line of sight. Subsequently, the rotation matrix R' indicating the conversion of the viewpoint information by the viewpoint converter 103 is calculated by an expression (6).

$$k = |\sin(\theta)| \qquad \text{expression (5)}$$

$$R' = \begin{pmatrix} \cos(-k\gamma) & -\sin(-k\gamma) & 0 \\ \sin(-k\gamma) & \cos(-k\gamma) & 0 \\ 0 & 0 & 0 \end{pmatrix} \qquad \text{expression (6)}$$

The matrix P' indicating the converted viewpoint information is calculated by the application of the rotation matrix R' calculated in the expression (6) to the expression (4). Note that the coefficient k used to adjust the extent of the conversion of the viewpoint information is not limited to the coefficient defined by the expression (5). For example, as expressed in an expression (7), the coefficient k can be defined so as to be proportional to the degrees of the angle between the reference direction and the direction of the line of sight.

$$k = \begin{cases} a \cdot (\pi + \theta) & \left(-\pi \leq \theta < -\frac{\pi}{2}\right) \\ a \cdot |\theta| & \left(-\frac{\pi}{2} \leq \theta \leq \frac{\pi}{2}\right) \\ a \cdot (\pi - \theta) & \left(\frac{\pi}{2} < \theta \leq \pi\right) \end{cases} \qquad \text{expression (7)}$$

In the expression (7), for example, a coefficient a=2/π holds such that k=1 holds when the reference direction is perpendicular to the direction of the line of sight and k=0 holds when the reference direction is parallel to the direction of the line of sight.

In place of the coefficient defined by the expression (5) or (7), the coefficient k may, for example, be a coefficient such that k=1 holds when the value of the θ is in a predetermined range and 0≤k<1 holds when the value of the θ is outside the predetermined range. In other words, the viewpoint converter 103 may correct the inclination of the determined-viewpoint image caused by the rotation angle around the line of sight as an axis to a larger extent when the θ is in the predetermined range than when the θ is outside the predetermined range.

As described above, the viewpoint converter 103 adjusts the extent of the correction of the inclination of the determined-viewpoint image depending on the relationship between the reference direction and the direction of the line of sight. This adjustment enables the image processing apparatus 100 to output an image with which the user feels less uncomfortable even if the direction of the line of sight with respect to the reference direction varies. The adjustment of the extent of the correction of the inclination has been described above.

Note that there may be a case in which the user does not desire the correction of the inclination depending on the purpose of the determined-viewpoint image. In light of the foregoing, the image processing apparatus 100 may be configured to enable the user to select whether to correct the inclination of the determined-viewpoint image.

Note that, in the present embodiment, the example in which the viewpoint converter 103 converts the rotation angle around the line of sight as an axis included in the viewpoint information acquired by the transmission/reception unit 101 and then the image output unit 104 generates and outputs an image in accordance with the converted viewpoint information has mainly be described. However, the viewpoint converter 103 does not necessarily convert the viewpoint information. Instead, the image output unit 104 may perform a process for rotating the image. Specifically, the image output unit 104 generates a first determined-viewpoint image of which inclination is not corrected by synthesizing a plurality of images captured from a plurality of directions using the viewpoint information acquired by the transmission/reception unit 101. Subsequently, the image output unit 104 performs a process for rotating the first determined-viewpoint image so as to generate and output a second determined-viewpoint image of which inclination is corrected in comparison with the inclination of the first determined-viewpoint image. The extent to which the first determined-viewpoint image is rotated is determined based on the viewpoint information and the reference direction. For example, the image output unit 104 may rotate the image by the angle γ indicating the difference between the target direction and the reference direction. Note that the image output unit 104 may perform a process for transforming the image in addition to the rotation so as to transform the shape of the image into an appropriate shape when the image output unit 104 generates a second determined-viewpoint image by performing the process for rotating the first determined-viewpoint image.

Furthermore, the reference direction determined by the direction determination unit 102 is not limited to the reference direction described above. For example, the image capturing apparatus 200 includes a gravity sensor so as to transmit the measurement result of the gravity sensor together with the viewpoint information to the image processing apparatus 100. Subsequently, in accordance with the measurement result of the gravity sensor received from the image capturing apparatus 200 and the viewpoint information, the direction determination unit 102 may determine the direction of the gravity of the measurement result put in the coordinate system that is the reference for the viewpoint information as the reference direction. In this example, based on the inclination of the image capturing apparatus 200 with respect to the horizon, the inclination of the determined-viewpoint image is determined. Alternatively, the reference direction may be an arbitrary direction designated by the user. Furthermore, the process for correcting the inclination included in the viewpoint information is not limited to the process for making the downward direction (y direction) of the determined-viewpoint image close to the direction of gravitational force in the determined-viewpoint image. For example, the process for correcting the inclination included in the viewpoint information may be a process for making a direction specific to the object in the output image close to a predetermined direction of the output image. The direction specific to the object is a direction determined based on the direction that the object faces or the shape of the object, for example, the direction perpendicular to the plane on which a human-model object stands.

In the present embodiment, the example in which the image processing apparatus 100 acquires the position information and orientation information about the apparatus operated by the user as the viewpoint information indicating the position of viewpoint, the direction of the line of sight, and the rotation angle around the line of sight as an axis has mainly been described. Specifically, the image capturing apparatus 200 operated by the user transmits the position and orientation of the image capturing apparatus 200 calculated from the captured image as the viewpoint information to the image processing apparatus 100, and the image processing apparatus 100 receives and acquires the viewpoint information. According to this method, the user can intuitively designate the viewpoint by physically operating the apparatus.

Note that the apparatus operated by the user is not limited to the image capturing apparatus 200. The user may operate a device including a sensor with six degrees of freedom (for example, a GPS sensor and an angle sensor) such that the image processing apparatus 100 may acquire the measurement result from the sensor as the viewpoint information. Alternatively, the user may operate an object having a marker in a range in which a fixed camera can capture an image such that the image processing apparatus 100 may acquire the position and orientation of the marker calculated based on the image captured by the fixed camera as the viewpoint information. Alternatively, the user may operate a robot such that the image processing apparatus 100 may acquire the angle of each joint of the robot as the viewpoint information. Furthermore, not only the viewpoint information based on the apparatus operated by the user, the image processing apparatus 100 may acquire the viewpoint information generated by the designation of a numerical value by the user or by another method.

In any method in which the viewpoint information is acquired, the image processing apparatus 100 generates a determined-viewpoint image by performing a process for correcting the inclination included in the viewpoint information. This correction reduces the inclination of the output determined-viewpoint image and thus improves the visibility of the output image for the user. In particular, when the user physically operates an apparatus and designates a viewpoint based on the position and orientation of the apparatus, it may be difficult to accurately control the apparatus as intended. Even in such a case, by using the technique of the present embodiment, the inclination of the output image can appropriately be controlled.

According to the embodiment, when an image in accordance with the information about a viewpoint is output, the visibility of the output image can be improved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-016372, filed Jan. 29, 2016, which is hereby incorporated by reference herein in its entirety.

What is claimed is:

1. An image processing apparatus comprising:
    a processor; and
    a memory storing one or more programs configured to be executed by the processor, the one or more programs including instructions for:
    acquiring virtual viewpoint information indicating a virtual viewpoint;
    generating a virtual viewpoint image based on both of a plurality of captured images captured by multiple cameras from a plurality of directions and the virtual viewpoint information acquired in the acquiring, wherein, according to the virtual viewpoint information acquired in the acquiring, an inclination correction process for correcting an inclination based on the virtual viewpoint information is executed to generate the virtual viewpoint image to be output; and
    outputting the generated virtual viewpoint image.

2. The image processing apparatus according to claim 1, wherein the inclination correction process is a process for making a reference direction in the virtual viewpoint image close to a target direction of the virtual viewpoint image.

3. The image processing apparatus according to claim 2, wherein the target direction is a downward direction of the virtual viewpoint image, and the reference direction is a direction of gravitational force in the virtual viewpoint image.

4. The image processing apparatus according to claim 2, the one or more programs further including instructions for:
   determining a direction of the line of sight from the virtual viewpoint information acquired in the acquiring, wherein
   the virtual viewpoint image is generated after performing the inclination correction process to an extent in consideration of a relationship between the reference direction and the direction of the line of sight determined in the determining.

5. The image processing apparatus according to claim 4, wherein
   a rotation angle around the line of sight is determined in the determining as an axis from the virtual viewpoint information acquired in the acquiring, and
   when degrees of an angle between a vector of the reference direction and a vector of the direction of the line of sight determined in the determining is in a predetermined range, the virtual viewpoint image is generated after performing a process for correcting the inclination caused by the rotation angle to a larger extent than when the degrees of the angle between the vectors is outside the predetermined range.

6. The image processing apparatus according to claim 1, wherein the inclination correction process is a correction process for correcting a rotation around a line of sight determined from the virtual viewpoint information acquired as an axis.

7. The image processing apparatus according to claim 1, wherein
   a conversion process for correcting information about the inclination included in the virtual viewpoint information acquired in the acquiring is performed, and then the virtual viewpoint image is generated in accordance with the virtual viewpoint information corrected by the conversion process.

8. The image processing apparatus according to claim 1, wherein
   a first virtual viewpoint image is generated in the generating in accordance with the virtual viewpoint information acquired in the acquiring, and then a second virtual viewpoint image of which inclination is corrected in comparison with an inclination of the first virtual viewpoint image is generated in the generating by performing a rotation process for rotating the first virtual viewpoint image, and
   the second virtual viewpoint image is output.

9. The image processing apparatus according to claim 1, wherein
   position information and orientation information is acquired in the acquiring, wherein the position information and the orientation information is about an apparatus that a user operates to designate a virtual viewpoint as the virtual viewpoint information indicating a position of the viewpoint, a direction of a line of sight, and a rotation angle around the line of sight as an axis.

10. The image processing apparatus according to claim 1, wherein
    the virtual viewpoint information based on a captured image of a marker is acquired in the acquiring, and
    the inclination included in the virtual viewpoint information is determined based on an inclination of the marker in the captured image.

11. A control method for controlling an image processing apparatus, the control method comprising:
    acquiring virtual viewpoint information indicating a virtual viewpoint;
    generating a virtual viewpoint image based on both of a plurality of captured images captured by multiple cameras from a plurality of directions and the virtual viewpoint information, wherein an inclination correction process for correcting an inclination based on the virtual viewpoint information is executed to generate the virtual viewpoint image to be output; and
    outputting the generated virtual viewpoint image.

12. The control method according to claim 11, wherein
    the inclination correction process in the generating is a process for making a reference direction in the virtual viewpoint image close to a target direction of the virtual viewpoint image.

13. The control method according to claim 12, further comprising:
    determining a direction of the line of sight from the acquired virtual viewpoint information, wherein
    in the generating, the virtual viewpoint image is generated after the inclination correction process is performed to an extent in consideration of a relationship between the reference direction and the direction of the line of sight determined in the determining.

14. A non-transitory computer readable storage medium storing a program executable by a computer that works as an image processing apparatus, the program comprising:
    acquiring virtual viewpoint information indicating a virtual viewpoint;
    generating a virtual viewpoint image based on both of a plurality of captured images captured by multiple cameras from a plurality of directions and the virtual viewpoint information, wherein an inclination correction process for correcting an inclination based on the virtual viewpoint information is executed to generate the virtual viewpoint image to be output; and
    outputting the generated virtual viewpoint image.

* * * * *